(12) United States Patent
Miller et al.

(10) Patent No.: US 9,701,876 B2
(45) Date of Patent: Jul. 11, 2017

(54) REACTIVE ROOFING ADHESIVE

(71) Applicant: ADCO PRODUCTS, LLC, Michigan Center, MI (US)

(72) Inventors: John William Miller, Hudson, MI (US); Paul Snowwhite, Dexter, MI (US)

(73) Assignee: ADCO PRODUCTS, LLC, Michigan Center, MI (US)

( * ) Notice: Subject to any disclaimer, the term of this patent is extended or adjusted under 35 U.S.C. 154(b) by 0 days.

(21) Appl. No.: 14/069,653

(22) Filed: Nov. 1, 2013

(65) Prior Publication Data

US 2014/0127448 A1 May 8, 2014

Related U.S. Application Data

(63) Continuation-in-part of application No. 14/114,074, filed on Oct. 25, 2013.

(60) Provisional application No. 61/721,866, filed on Nov. 2, 2012, provisional application No. 61/806,022, filed on Mar. 28, 2013.

(51) Int. Cl.
*C09J 175/08* (2006.01)
*E04D 5/14* (2006.01)
*E04D 11/02* (2006.01)

(52) U.S. Cl.
CPC ............ *C09J 175/08* (2013.01); *E04D 5/148* (2013.01); *E04D 11/02* (2013.01); *Y10T 428/23986* (2015.04); *Y10T 428/24826* (2015.01); *Y10T 428/24851* (2015.01); *Y10T 428/249984* (2015.04); *Y10T 428/31547* (2015.04); *Y10T 428/31551* (2015.04); *Y10T 428/31587* (2015.04); *Y10T 428/31591* (2015.04); *Y10T 428/31598* (2015.04); *Y10T 428/31601* (2015.04); *Y10T 428/31605* (2015.04)

(58) Field of Classification Search
CPC .... C08G 18/10; C08G 18/40; C08G 18/4211; C08G 18/4825; C08G 18/4829; E04D 5/08; E04D 5/148; E04D 11/02; C09J 175/04; C09J 175/08; Y10T 428/23986; Y10T 428/24826; Y10T 428/24851; Y10T 428/249984; Y10T 428/31547; Y10T 428/31551; Y10T 428/31587; Y10T 428/31591; Y10T 428/31598; Y10T 428/31601; Y10T 428/31605
USPC .. 428/96, 317.5, 424.8, 425.1, 425.6, 425.8; 528/59, 65, 76, 85; 521/174
See application file for complete search history.

(56) References Cited

U.S. PATENT DOCUMENTS

| | | | |
|---|---|---|---|
| 4,489,176 A | 12/1984 | Kluth et al. | |
| 4,769,401 A | 9/1988 | Webber et al. | |
| 4,869,044 A | 9/1989 | Wald | |
| 4,996,812 A | 3/1991 | Venable | |
| 5,051,474 A * | 9/1991 | Warren et al. | 525/131 |
| 5,064,871 A * | 11/1991 | Sciangola | 521/124 |
| 5,175,228 A | 12/1992 | Wang et al. | |
| 5,183,877 A | 2/1993 | Swanson | |
| 5,253,461 A | 10/1993 | Janoski et al. | |
| 5,872,203 A | 2/1999 | Wen et al. | |

(Continued)

*Primary Examiner* — Thao T Tran
(74) *Attorney, Agent, or Firm* — Benesch, Friedlander, Coplan & Aronoff LLP

(57) ABSTRACT

A two-part adhesive includes an A side, a B side, at least one of a polyurethane prepolymer and a diisocyanate, at least one polyol, at least one catalyst, and at least one chain extender. The two-part adhesive may include an adhesion promoter.

16 Claims, 2 Drawing Sheets

(56) References Cited

U.S. PATENT DOCUMENTS

Figure 1:
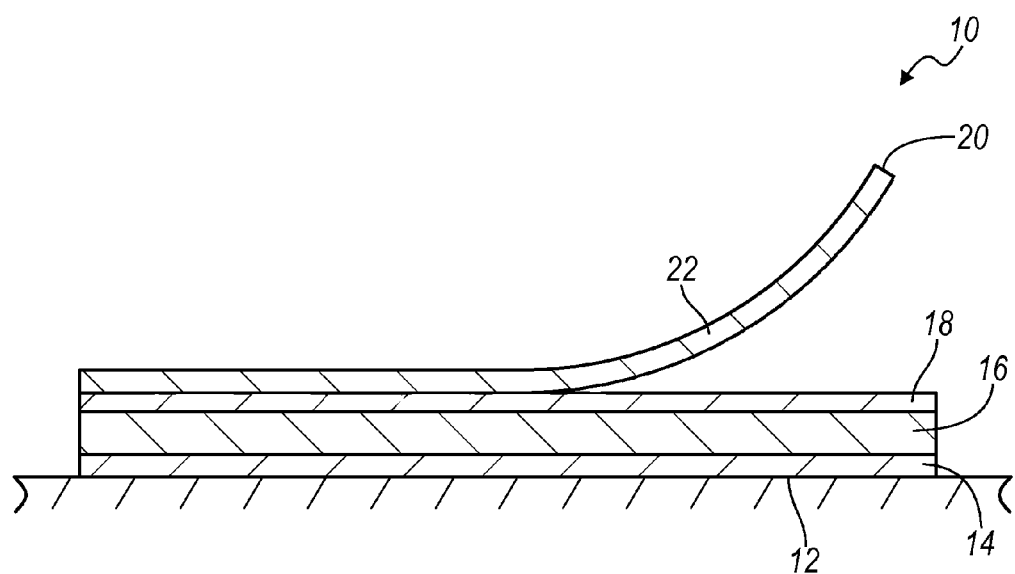

| | | |
|---|---|---|
| 5,951,796 A | 9/1999 | Murray |
| 6,103,850 A * | 8/2000 | Reichel et al. .............. 528/60 |
| 6,130,268 A | 10/2000 | Murray |
| 6,220,526 B1 | 4/2001 | Johnson |
| 6,305,143 B1 | 10/2001 | Streets et al. |
| 6,418,687 B1 | 7/2002 | Cox |
| 6,679,018 B2 | 1/2004 | Georgeau et al. |
| 6,742,313 B2 | 6/2004 | Ritland et al. |
| 6,794,449 B2 | 9/2004 | Fisher |
| 6,938,386 B2 | 9/2005 | Ritland et al. |
| 7,622,187 B2 | 11/2009 | Clarke et al. |
| 8,399,595 B2 * | 3/2013 | Tribelhorn ......... C08G 18/0895 156/331.1 |
| 2003/0195287 A1 | 10/2003 | Fisher |
| 2004/0180195 A1 | 9/2004 | Macuga |
| 2005/0246991 A1 | 11/2005 | Chen et al. |
| 2006/0078741 A1 * | 4/2006 | Ramalingam, Jr. ........ 428/411.1 |
| 2006/0189736 A1 * | 8/2006 | Mori et al. ................... 524/404 |
| 2007/0055038 A1 * | 3/2007 | Gimmnich et al. .......... 528/49 |
| 2007/0197675 A1 * | 8/2007 | Matsumoto .................. 521/174 |
| 2007/0270567 A1 * | 11/2007 | Suen .............................. 528/64 |
| 2008/0038548 A1 | 2/2008 | Clarke |
| 2008/0281013 A1 * | 11/2008 | Nakamura et al. .......... 521/164 |
| 2010/0193961 A1 | 8/2010 | Konishi et al. |
| 2010/0288431 A1 | 11/2010 | Bossaert et al. |
| 2011/0068306 A1 | 3/2011 | Liao et al. |
| 2011/0108183 A1 * | 5/2011 | Golombowski ............... 156/71 |

* cited by examiner

US 9,701,876 B2

REACTIVE ROOFING ADHESIVE

RELATED APPLICATIONS

This application claims the benefit of U.S. Provisional Patent Application No. 61/721,866, filed on Nov. 2, 2012, and U.S. Provisional Patent Application No. 61/806,022, filed on Mar. 28, 2013. This application is also a continuation-in-part of U.S. patent application Ser. No. 14/114,074, filed on Oct. 25, 2013, which is the U.S. National Stage Application of International Application No. PCT/US12/36570, filed on May 4, 2012, which claims the benefit of U.S. Provisional Patent Application No. 61/482,945, filed on May 5, 2011. The entire contents of the above applications are incorporated herein by reference.

FIELD

The present invention relates to one-part and two-part adhesives with low volatile organic compounds for use with untreated roofing membranes, roofing substrates, and insulation boards.

BACKGROUND

In many roofing applications, for example in large, flat commercial roof decks, the roofing substrate is a concrete, light weight concrete, wood, gypsum, wood fiber or steel roof deck. The roofing membrane is used to seal and protect the roof deck from environmental weather conditions and is placed over insulation boards, which provide insulative qualities. The insulation boards are typically secured to the roofing substrate or roof deck via an adhesive composition or fasteners. The roofing membrane may be made of various materials, such as polymeric materials including EPDM (ethylene propylene diene M-rubber), Mod Bit (Modified Bitumen), TPO (thermoplastic polyolefin), or polyvinyl chloride (PVC). The roofing membrane may also be a composite material that includes EPDM or TPO. The roofing membrane is adhered overtop insulation boards or panels using an adhesive composition such as mopping asphalt (typically Type III or Type IV) or other conventional adhesive compositions. These adhesives are applied to both the roofing membrane and the substrate.

A conventional adhesive composition used to adhere the roofing membrane to the roof deck or other substrate includes the use of an elastomer dissolved in solvent, such as, for example, a polychloroprene rubber in an acetone or toluene solvent. However, typical polychloroprene rubber adhesives are solvent based and contain high (>250 g/L) levels of volatile organic compounds (VOC) content. These adhesives cannot be sold in areas where federal, state or local regulations prohibit the use of such high VOC adhesives. Other polychloroprene rubber adhesives use water as a solvent. While useful for their intended purpose, however, these water based adhesives may have issues regarding temperature restrictions, long curing times and odor concerns. In addition, these adhesives are contact adhesives that require full coverage between the substrate and the membrane, which makes it difficult to re-position the membrane after contact with the adhesive. Accordingly, solvent and water based elastomer adhesives must be applied to both the substrate and the roofing membrane and cover substantially the entire surfaces of the adhering components.

Accordingly, there is room in the art for adhesive compositions in roofing applications that exhibit favorable properties, such as sufficient adhesive strength, shelf life, cure time, tack, and that are easily applied including the ability to re-position the membrane after contact with the adhesive.

SUMMARY

A two-part adhesive includes an A side, a B side, at least one of a polyurethane prepolymer and a diisocyanate, at least one polyol, at least one catalyst, and at least one chain extender. The two-part adhesive may include an adhesion promoter.

In some arrangements, the at least one of a polyurethane prepolymer and a diisocyanate is present in the A side in an amount from about 50% to 100% by weight of the A side composition. The at least one polyol is present in the B side in an amount from about 52% to about 98% by weight of the B side composition. The at least one catalyst is present in the B side in an amount from about 0.5% to about 5% by weight of the B side composition. The at least one chain extender is present in an amount from about 2% to 2.5% by weight of the B side composition. When included in the adhesive, the at least one adhesion promoter is present in at least one of the A side composition and the B side composition in an amount of at least 1% by weight of the two-part adhesive. A ratio of isocyanate groups in the A side to hydroxyl groups in the B side is greater than 1.5:1.

In another aspect, a two-part pressure sensitive adhesive (PSA) having an A side and a B side includes at least one prepolymer in the A side, at least two polyols present in the B side, at least two catalysts present in the B side, at least one blowing agent present in the B side.

In yet another aspect, a composite roof structure includes a roofing substrate having a substrate surface, a roofing membrane having a membrane surface that opposes the substrate surface of the roofing substrate, and an adhesive layer directly adhering to the substrate surface of the roofing substrate and directly adhering to the membrane surface of the roofing membrane. The adhesive layer is the product of mixing a B side composition and an A side composition. The B side composition includes a polyol, a catalyst and a chain extender, and the A side composition includes at least one of a polyurethane prepolymer and a diisocyanate.

Further features, advantages and areas of applicability will become apparent from the description provided herein. It should be understood that the description and specific examples are intended for purposes of illustration only and are not intended to limit the scope of the present disclosure.

DRAWINGS

Figure 2:
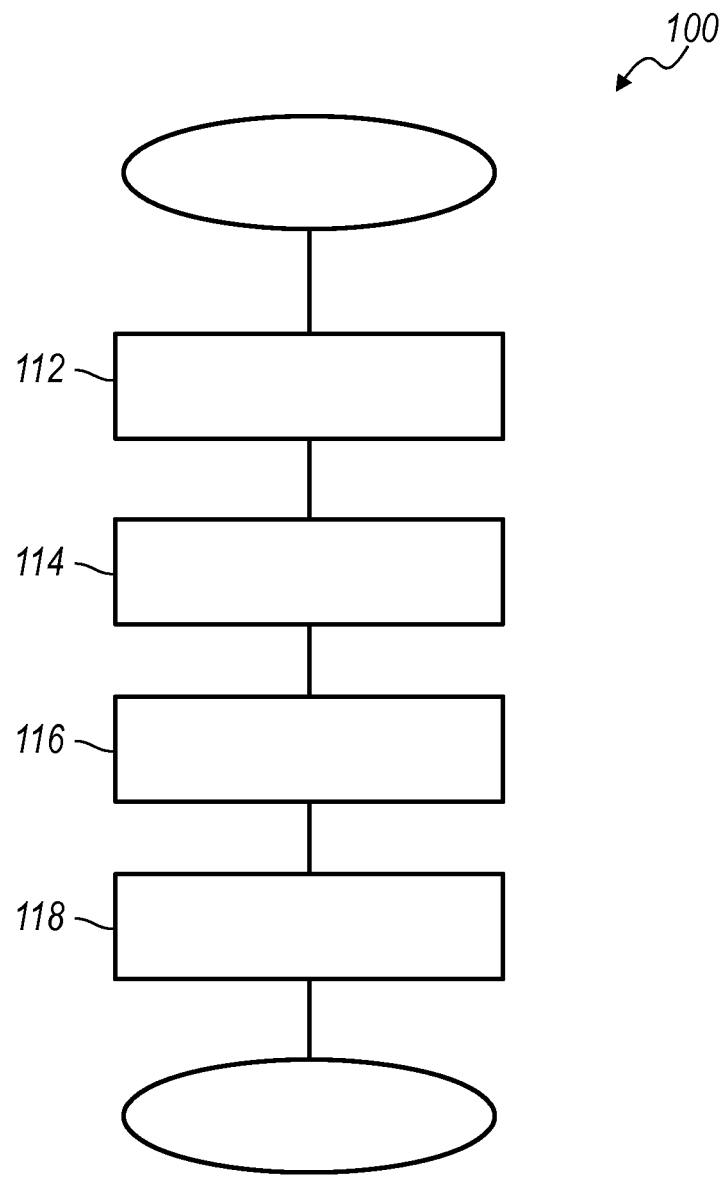

The drawing described herein is for illustration purposes only and is not intended to limit the scope of the present disclosure in any way. In the drawing:

FIG. 1 illustrates a membrane applied to a substrate with an adhesive in accordance with the principles of the present invention; and FIG. 2 is a flow chart of a method for adhering a roofing membrane to a roof member in accordance with the principles of the present invention.

DETAILED DESCRIPTION

The following description is merely exemplary in nature and is not intended to limit the present disclosure, application, or uses.

A roofing membrane is used to seal and protect the roof deck from environmental weather conditions and is placed over insulation boards that insulate the roof deck. The roof deck may take various forms including, for example, a concrete, light weight concrete, wood, gypsum, wood fiber or steel roof deck. The insulation boards may be in various configurations such as rolled sheets and be made of various materials without departing from the scope of the present invention. The roofing membrane may be made of various materials, such as polymeric materials including EPDM (ethylene propylene diene monomer-rubber), TPO (thermoplastic polyolefin), polyvinyl chloride (PVC), ketone ethylene ester (KEE), or SBS or APP Modified Bitumens. The roofing membrane may be a composite material that includes EPDM or TPO or other suitable membranes. An adhesive composition according to the principles of the present invention is provided for securing a first component, such as the above-described roofing membrane or insulation boards, to a second component or roofing substrate, such as a roof deck or existing roofing membrane. For example, in one embodiment, the adhesive composition adheres a new roofing membrane to an existing worn roofing membrane. The existing roofing membrane is preferably cleaned with a pressure washer or broomed, swept or blown free of dirt and debris. Additionally, the cleaned roof can, but need not, be primed.

With reference to FIG. 1, an assembly using an adhesive composition in accordance with the principles of the present invention is generally indicated by reference number 10. The assembly includes a substrate 12, a first adhesive layer 14, an insulation board or cover board 16, a second adhesive layer 18, and a fleece backed or non-fleeced back membrane 20. The substrate 12 may take various forms including, for example, a concrete, light weight concrete, wood, gypsum, wood fiber or steel roof deck. The first adhesive layer 14 is applied to the substrate 12. The first adhesive layer 14 adheres the insulation board 16 to the substrate 12. Various adhesives may be used as described below, including, for example, a two-part foamed polyurethane adhesive. The first adhesive layer 14 may be applied in sheets, beads or as strips overtop the substrate 12. The insulation board 16 may then be pressed onto the substrate 12. It should be appreciated that the insulation board 16 my take various forms, such as rolled sheets, and be made of various materials without departing from the scope of the present invention. The second adhesive layer 18 is applied overtop the insulation board or cover board layer 16. The second adhesive layer 18 may be a one-part or a two-part adhesive composition generally formed by combining the two separate compositions or blends prior to application on the roofing substrate. Once the second adhesive layer 18 has been applied to the insulation board or cover board layer 16, the membrane 20 is rolled or otherwise applied overtop the adhesive layer 18. The membrane 20 is preferably a rubber like layer made from, for example, EPDM or TPO.

The adhesive composition is either a one-part or a two-part reactive adhesive composition. The adhesive composition generally includes a polyol, a pre-polymer, a catalyst, and may or may not contain an adhesion promoter.

The polyol may be any compound conventionally used in the production of polyurethanes having at least one isocyanate-reactive functionality. These polyols include glycols, diols, mono alcohols or multi-functional alcohols. One exemplary polyol suitable with the composition of the present invention includes an ortho phthalate-diethylene glycol based aromatic polyester polyol commercially available from Stepan under the designation STEPANPOL PS-2352. Another exemplary polyol suitable with the composition of the present invention includes a di-functional polyether diol commercially available from Huntsman under the designations JEFFOL PPG-1000 and JEFFOL PPG-2000. Another exemplary polyol suitable with the present invention includes a multi-functional polyether polyol commercially available from BASF under the designation PLURACOL SG360. Chemical derivatives and combinations of polyols may also be employed in the composition without departing from the scope of the present invention. The polyol comprises from about 30% to about 50% by weight of the composition.

The prepolymer or polymer precursor may be any polyurethane prepolymer formed by combining an excess of diisocyanate with a polyol to yield a diisocyanate prepolymer. The prepolymer reacts like a diisocyanate but with several important differences. When compared with the original diisocyanate, the prepolymer has a greater molecular weight, a higher viscosity, a lower isocyanate content by weight (% NCO), and a lower vapor pressure. One exemplary prepolymer suitable with the composition of the present invention includes a moisture cure prepolymer commercially available from Huntsman under the designation RUBINATE 9272. Another exemplary prepolymer suitable with the composition of the present invention includes a 4,4'-MDI prepolymer commercially available from Huntsman under the designation RUBINATE 1209. Combinations of prepolymers and commercially available prepolymers or modified prepolymers may also be employed in the composition without departing from the scope of the present invention. In one embodiment, the prepolymer comprises from about 30% to about 70% by weight of the composition.

The catalyst may be a metal or an amine based urethane catalyst. It is preferably amine based, more preferably a diazole, and even more preferably an imidazole. One exemplary catalyst suitable with the composition of the present invention includes 1-methylimidazole, commercially available from Air Products and Chemicals, Inc. under the designation IMICURE AMI-1. A secondary catalyst can also be used. An example includes a quaternary ammonium salt, Dabco TMR-3, commercially available from Air Products and Chemicals. Combinations of catalysts may also be employed in the composition without departing from the scope of the present invention. The catalyst comprises from about 0.5% to about 5% by weight of the composition.

The blowing agent may be reactive or non-reactive. Non-reactive blowing agents include hydrocarbons and hydrofluorocarbons. Reactive blowing agents react with the isocyanate group which produces carbon dioxide. The carbon dioxide generation produces cellular structure within the adhesive. The application of the membrane will crush the adhesive thereby releasing the generated carbon dioxide. Water is a commonly used reactive blowing agent in two-part polyurethanes. When water is included in the B side of a two-part polyurethane, the water reacts with the A side components upon mixing of the A and B sides. Additionally, water is not considered a VOC or solvent.

The adhesive composition may include adhesion promoters such as chlorinated waxes, chlorinated paraffins or chlorinated polyolefins. An example is Paroil 60H, commercially available from Dover Chemicals.

The adhesive composition may further include other additives, such as, for example, tackifiers, fillers, plasticizers, surfactants, rheology modifiers, viscosity modifiers, and thixotropic agents. Fillers, plasticizers, rheology modifiers, surfactants, and thixotropic agents may be used to alter the liquid viscosity to either or both of parts A and B, optimize mixing properties during dispensing, enhance air entrainment, improve wet out, and improve flow properties of the adhesive during application. Examples of fillers include silica particles and talc. Examples of plasticizers include process oils and phthalates. Examples of rheology modifiers include organoclays, natural clays, and fumed silica. An exemplary organoclay is CLAYTONE APA available from Southern Clay Products. The surfactants may include silicone based or non-silicone based compounds. Tackifiers may be added to improve initial green strength and may be selected, for example, from a group including polyterpenes, rosin esters, phenolic resins, hydrocarbon resins, and hydrogenated resins.

The amount of the components included in the composition is selected to balance tack, cure speed, and adhesion strength of the adhesive. For example, the embodiments presented exhibit adhesive tack when cured and the foam adhesive is substantially soft with a low modulus. The low modulus allows for diffusion of the adhesion promoter to the substrate surface and improves heat aged adhesive strength.

The "A" side and "B" sides are mixed so that the ratio of the reactive components, ie, ratio of "A" side isocyanate groups to "B" side hydroxyl groups, is greater than 1.5:1. This ratio is also known as the Isocyanate index and stoichiometrically one isocyanate group reacts with one hydroxyl group. In several of the examples presented below, this Isocyanate index and the prepolymer incorporated combine to produce a soft, non-rigid adhesive.

The adhesive composition is prepared by mixing the components prior to application on a substrate. In a one-part adhesive configuration, the components are mixed prior to packaging into a single container. The adhesive is then dispensed or otherwise applied to the roofing substrate or the roofing membrane and is cured in-situ via moisture cure. Due to the reactive nature of the adhesive composition, the adhesive composition may be applied in ribbon or bead method and may be applied to only one side of the substrate or roofing membrane. Additionally, the adhesive compositions provided herein are sprayable. In some of the adhesive composition examples described below the sprayability of the adhesive composition is facilitated using equipment that is capable of modifying the viscosity of the adhesive through the application of heat or like methods.

In a two-part adhesive configuration, the adhesive is formed by combining two separate compositions or blends just prior to application on the roofing substrate. The two parts include a "B side" or resin side and an "A side" or prepolymer side. Each of the sides is packaged separately and is mixed by an applicator prior to applying on the roofing substrate. The A and B side components may be packaged in several ways. For example, each may be stored in a collapsible bag disposed within a box such as Cubitainer® by Hedwin or Cheertainer® by CDF, stored in rigid containers such as drums or barrels, paired in cylinders, or in flexible, fully compressible structures such as collapsible tubes that dispense the materials. In the example provided, the B side includes the polyol and the catalyst and the A side includes the prepolymer. The adhesive, once mixed, is dispensed or otherwise applied to the roofing substrate or the roofing membrane. During mixing, and after mixing, the components react to form a polyurethane adhesive having suitable physical properties. Due to the reactive nature of the adhesive composition, the adhesive composition may be applied in ribbon or bead method and may be applied to only one side of the substrate or roofing membrane. As noted above, the A Side and B Side components are preferably mixed by an applicator just prior to being dispensed or otherwise applied to the roofing substrate. For example, the polyurethane adhesive composition is applied as discrete beads or ribbons. Space is left between adhesion points, thereby allowing any entrapped volatiles to escape through the system. For example, trapped water, such as rain drops on an existing roof surface, which is recovered with a new waterproofing membrane, may become an entrapped volatile. Forms of application include using a cartridge, using low pressure pumping of the two components and mixing them with a static mixer, or using high pressure tanks that are brought to about 500-1500 psi with an inert dry gas, such as Nitrogen. In the latter form of application, the A and B side materials are metered as two individual components and brought together and mixed by high pressure impingement or by a static mixer and then applied in a bead or ribbon form.

In addition, a multi bead applicator system in which individual components are brought together under ambient conditions and are mixed generally through a static mixer may be employed, such as described in U.S. Patent Application Publication No. 2012/0012054, filed Jul. 5, 2011, the entire contents of which are incorporated herein by reference. The multi bead applicator system may include individual two-component cylinders or the two components may be brought together under various pumping methodologies and mixed through a static mixer. The "A" and "B" side components are generally mixed in a ratio of 1:1 by volume, however the ratio may range from about 10:1 to about 1:10. During mixing, and after mixing, the A Side components and B Side components react to form a polyurethane adhesive having suitable physical properties. Preferably, the adhesive composition is applied in discrete beads or ribbons overtop the roofing substrate, such as the insulation boards or roof deck or roofing membrane. Next, the roofing membrane is rolled or otherwise positioned overtop of the adhesive composition and the roofing substrate. The adhesive composition then cures and secures the roofing membrane to the roofing substrate. Due to the formulation of the adhesive composition of the present invention, the roofing substrate and the roofing membrane may be untreated, i.e., no primer or membrane fleece back is required to achieve the desired adhesive strength. Therefore, no fleece backing or primer needs to be applied during membrane production in the factory or during membrane installation at the job site. The multi-bead applicator may also be used to apply the adhesive composition in a one-part configuration.

In order that the invention may be more readily understood, reference is made to the following examples which are intended to illustrate various embodiments of the adhesive composition of the present invention, but not limit the scope thereof:

Example 1 (One-Part Adhesive)

| Material | Exemplary Trade Name | Percent by Weight |
|---|---|---|
| Polyol | STEPANPOL 2352 | 25-35% |
| Moisture cure prepolymer | RUBINATE 9272 | 60-70% |
| Catalyst | 2,2-dimorphorlinodiethylether | 1.0-5.0% |

Example 2 (Two-Part Adhesive)

| Material | Exemplary Trade Name | Percent by Weight of total | of side |
|---|---|---|---|
| "B" or Resin Side | | | |
| Polyol | JEFFOL PPG-2000 | 45-55% | 92-98% |
| Curing Agent | IMICURE AMI-1 | 2.0-3.0% | 0.5-5.0% |
| "A" or Prepolymer Side | | | |
| Prepolymer | RUBINATE 1209 | 45-55% | 92-98% |
| Catalyst | 2,2-dimorphorlinodi-ethylether | 1.0-5.0% | 0.5-5.0% |

Example 3 (Two-Part Adhesive)

| Material | Exemplary Trade Name | Percent by Weight of total | of side |
|---|---|---|---|
| "B" or Resin Side | | | |
| Polyol | JEFFOL PPG-2000 | 30-40% | 92-98% |
| Curing Agent | IMICURE AMI-1 | 2.0-3.0% | 0.5-5.0% |
| "A" or Prepolymer Side | | | |
| Prepolymer | RUBINATE 9272 | 60-70% | 92-98% |
| Catalyst | JEFFCAT DMDEE | 1.0-5.0% | 0.5-5.0% |

Example 4 (Two-Part Adhesive)

| Material | Exemplary Trade Name | Percent by Weight | |
|---|---|---|---|
| "B" or Resin Side | | | |
| Polyol | JEFFOL PPG-1000 | 45-55% | 92-98% |
| Curing Agent | IMICURE AMI-1 | 2.0-3.0% | 0.5-5.0% |
| "A" or Prepolymer Side | | | |
| Prepolymer | RUBINATE 1209 | 45-55% | 92-98% |
| Catalyst | JEFFCAT DMDEE | 1.0-5.0% | 0.5-5.0% |

Example 5 (Two-Part Adhesive)

| Material | Exemplary Trade Name | Percent by Weight | |
|---|---|---|---|
| "B" or Resin Side | | | |
| Polyol | JEFFOL PPG-1000 | 45-55% | 92-98% |
| Catalyst | IMICURE AMI-1 | 1.0-3.0% | 0.5-5.0% |
| "A" or Prepolymer Side | | | |
| Prepolymer | RUBINATE 9272 | 45-55% | 92-98% |
| Catalyst | JEFFCAT DMDEE | 1.0-5.0% | 0.5-5.0% |

Examples 6, 7, 8 and 9 (Two-Part Adhesives)

| Components | Trade Name | 6 Wt % | 7 Wt % | 8 Wt % | 9 Wt % |
|---|---|---|---|---|---|
| "B" or Resin Side | | | | | |
| Polyol | JEFFOL PPG-2801 | 95.20 | 94.45 | 94.45 | 93.65 |
| Catalyst | IMICURE AMI-1 | 4.80 | 4.80 | 4.80 | 4.80 |
| | DABCO TMR-3 | | 0.50 | 0.50 | 0.50 |
| | Di-ethanolamine | | | | 0.80 |
| Blowing Agent | Water | | 0.25 | 0.25 | 0.25 |
| "A" or Prepolymer Side | | | | | |
| Prepolymer | RUBINATE 9404 | 100.0 | | | 100.00 |
| | RUBINATE 9040 | | 100.0 | | |
| | RUBINATE 9009 | | | 70.0 | |
| Additive | PAROIL 140LV | | | 30.0 | |

Examples 10, 11, and 12 (Two-Part Adhesives)

| Components | Trade Name | 10 Wt % | 11 Wt % | 12 Wt % |
|---|---|---|---|---|
| "B" or Resin Side | | | | |
| Polyol | JEFFOL PPG-2801 | 96.75 | 96.75 | 96.75 |
| Catalyst | POLYCAT 8 | 3.00 | | |
| | DABCO 33LV | | 3.00 | |
| | POLYCAT 5 | | | 3.00 |
| Blowing Agent | Water | 0.25 | 0.25 | 0.25 |
| "A" or Prepolymer Side | | | | |
| Prepolymer | RUBINATE 9272 | 70.00 | 70.00 | 70.00 |
| Additive | PAROIL 10 | 30.00 | | 15.00 |
| | PAROIL 8707 | | 30.00 | 15.00 |

Examples 13, 14, and 15 (Two-Part Adhesives)

| Components | Trade Name | 13 Wt % | 14 Wt % | 15 Wt % |
|---|---|---|---|---|
| "B" or Resin Side | | | | |
| Polyol | JEFFOL PPG-2801 | 96.75 | 96.75 | 96.75 |
| Catalyst | POLYCAT 5 | 3.00 | 3.00 | 3.00 |
| Blowing Agent | Water | 0.25 | 0.25 | 0.25 |
| "A" or Prepolymer Side | | | | |
| Prepolymer | RUBINATE 9272 | 70.00 | 70.00 | 70.00 |
| Additive | PAROIL 140 | 30.00 | | |
| | PAROIL 142LV | | 30.00 | |
| | PAROIL 45 | | | 30.00 |

Examples 16, 17, and 18 (Two-Part Adhesives)

| Components | Trade Name | 16 Wt % | 17 Wt % | 18 Wt % |
|---|---|---|---|---|
| "B" or Resin Side | | | | |
| Polyol | JEFFOL PPG-2801 | 96.75 | 96.75 | 96.75 |
| Catalyst | POLYCAT 5 | 3.00 | 3.00 | 3.00 |
| Blowing Agent | Water | 0.25 | 0.25 | 0.25 |
| "A" or Prepolymer Side | | | | |
| Prepolymer | RUBINATE 9272 | 70.00 | 70.00 | 70.00 |
| Additive | PAROIL 1045 | 30.00 | | |
| | PAROIL 42 | | 30.00 | |
| | PAROIL 54NR | | | 30.00 |

Examples 19, 20, and 21 (Two-Part Adhesives)

| Components | Trade Name | 19 Wt % | 20 Wt % | 21 Wt % |
|---|---|---|---|---|
| "B" or Resin Side | | | | |
| Polyol | JEFFOL PPG-2801 | 96.75 | 96.75 | 96.75 |
| Catalyst | POLYCAT 5 | 3.00 | 3.00 | 3.00 |
| Blowing Agent | Water | 0.25 | 0.25 | 0.25 |
| "A" or Prepolymer Side | | | | |
| Prepolymer | RUBINATE 9272 | 70.00 | 70.00 | 70.00 |
| Additive | PAROIL 140 LV | 30.00 | | |
| | PAROIL 50 | | 30.00 | |
| | PAROIL 145 | | | 30.00 |

Examples 22, 23, and 24 (Two-Part Adhesives)

| Components | Trade Name | 22 Wt % | 23 Wt % | 24 Wt % |
|---|---|---|---|---|
| "B" or Resin Side | | | | |
| Polyol | JEFFOL PPG-2801 | 96.75 | 96.75 | 96.75 |
| Catalyst | POLYCAT 5 | 3.00 | 3.00 | 3.00 |
| Blowing Agent | Water | 0.25 | 0.25 | 0.25 |
| "A" or Prepolymer Side | | | | |
| Prepolymer | RUBINATE 9272 | 70.00 | 70.00 | 70.00 |
| Additive | PAROIL 53NR | 30.00 | | |
| | PAROIL 40 | | 30.00 | |
| | PAROIL 10 | | | 30.00 |

In some arrangements, the one-part adhesive includes a polyol that is present in the amount from about 25% to about 70% by weight of the adhesive composition and a prepolymer such as, for example, an isocyanate that is present in the amount from about 25% to about 70% by weight of the adhesive composition.

Each of examples 2-23 are mixed in a 1:1 ratio. Alternative weight percentages and mixing ratios may be incorporated without departing from the scope of the present invention. Additionally, it should be appreciated that the exemplary trade name materials referenced are for illustration purposes only, and that suitable equivalent manufacturers may be employed. In addition, composition may include other additives without departing from the scope of the present invention.

The following table includes test data for Examples 6-23 after the adhesive formulations are applied between two 45 mil RUBBERGARD EPDM membrane strips available from Firestone. The breakaway strength is determined on an Instron machine using a "T" peel testing setup as defined by ASTM D1876.

| Sample | Breakaway Strength - aged 24 h @ 75 F. (in pli) | Breakaway Strength - aged 24 h @ 158 F. (in pli) | Breakaway Strength - aged 24 h @ 212 F. (in pli) |
|---|---|---|---|
| Example 6 | 2.32 | 3.26 | 5.03 |
| Example 7 | 1.32 | 1.94 | 3.81 |
| Example 8 | 0.9 | 1.22 | 1.3 |
| Example 9 | 1.33 | — | 2.61 |
| Example 10 | 0.87 | 1.19 | 1.24 |
| Example 11 | 1.57 | 1.42 | 1.76 |
| Example 12 | 1.87 | 1.49 | 1.75 |
| Example 13 | 1.14 | — | 1.79 |
| Example 14 | 0.67 | — | 1.11 |
| Example 15 | 0.96 | — | 1.29 |
| Example 16 | 1.36 | — | 1.65 |
| Example 17 | 1.74 | — | 2.16 |
| Example 18 | 1.17 | — | 1.98 |
| Example 19 | 1.23 | — | 1.05 |
| Example 20 | 1.3 | — | 2.05 |
| Example 21 | 1.11 | — | 1.16 |
| Example 22 | 1.67 | — | 1.58 |
| Example 23 | 0.8 | — | 0.95 |
| Example 24 | 1.11 | — | 1.54 |

Examples 25, 26, 27, 28, 29 and 30 (Two-Part Adhesives)

| Components | Trade Name | 25 Wt % | 26 Wt % | 27 Wt % | 28 Wt % | 29 Wt % | 30 Wt % |
|---|---|---|---|---|---|---|---|
| "B" or Resin Side | | | | | | | |
| Polyol | JEFFOL PPG-2801 | 94.45 | 94.45 | 94.45 | 94.45 | 92.45 | 91.95 |
| Catalyst | IMICURE AMI-1 | 4.80 | 4.80 | 4.80 | 4.80 | 4.80 | 4.80 |

-continued

| | | | | | | | |
|---|---|---|---|---|---|---|---|
| Catalyst | Dabco TMR-3 | 0.50 | 0.50 | 0.50 | 0.50 | 0.50 | 0.50 |
| Blowing Agent | Water | 0.25 | 0.25 | 0.25 | 0.25 | 0.25 | 0.25 |
| Chain Extender | Glycerin | | | | | 2.0 | 2.5 |
| "A" or Prepolymer Side | | | | | | | |
| Prepolymer | Lupranate 5020 | 100.00 | 90.00 | | | | |
| Additive | Rubinate 9272 | | | 90.00 | 90.00 | | |
| | Cereclor S-52 | | 10.00 | | 10.00 | | |
| | Rubinate 9040 | | | | | 100.00 | 100.00 |

| Sample | Breakaway Strength - aged 7 days @ 75 F. (in pli) | Breakaway Strength - aged 7 days @ 158 F. (in pli) | Breakaway Strength - aged 7 days @ 212 F. (in pli) |
|---|---|---|---|
| Example 25 | 1.29 | — | 7.62 |
| Example 26 | 1.96 | — | 14.13 |
| Example 27 | 0.83 | — | 3.29 |
| Example 28 | 0.97 | — | 9.88 |
| Example 29 | 1.12 | | |
| Example 30 | 1.12 | | |

Examples 31, 32, 33, 34 and 35 (Two-Part Adhesives): PSA's

| Components | Trade Name | 31 Wt % | 32 Wt % | 33 Wt % | 34 Wt % | 35 Wt % |
|---|---|---|---|---|---|---|
| "B" or Resin Side | | | | | | |
| Polyol | JEFFOL PPG-1000 | 100.00 | 89.73 | 85.00 | 80.28 | 75.56 |
| Polyol | Lupranol SG-360 | | 4.72 | 9.45 | 14.17 | 18.89 |
| Catalyst | IMICURE AMI-1 | 4.80 | 4.80 | 4.80 | 4.80 | 4.80 |
| Catalyst | Dabco TMR-3 | 0.50 | 0.50 | 0.50 | 0.50 | 0.50 |
| Blowing Agent | Water | 0.25 | 0.25 | 0.25 | 0.25 | 0.25 |
| "A" or Prepolymer Side | | | | | | |
| Prepolymer | Rubinate 9040 | 100.00 | 100.00 | 100.00 | 100.00 | 100.00 |

| Sample | Breakaway Strength - aged 7 days @ 75 F. (in pli) | Breakaway Strength - aged 7 days @ 158 F. (in pli) | Breakaway Strength - aged 7 days @ 212 F. (in pli) |
|---|---|---|---|
| Example 31 | 0.40 | 2.07 | 1.81 |
| Example 32 | 2.10 | 3.15 | 3.67 |
| Example 33 | 1.40 | 1.73 | 1.90 |
| Example 34 | 1.10 | 1.27 | 1.60 |
| Example 35 | 0.70 | 0.71 | 0.93 |

Example 6 exhibited a 135 psf wind uplift rating and Example 7 exhibited a 120 psf wind uplift rating when tested using the Factory Mutual 4470 test method. Specifically, the adhesive formulations were applied as part of an installed single-ply roofing system on a wind uplift resistance table. Within the system, the adhesives adhered 45 mil Firestone RUBBERGARD EPDM membrane onto 0.5 inch Firestone ISO Gard HD Coverboard, which was adhered to Firestone 1½ ISO 95+GL Polyisocyanurate Insulation Board with Firestone I.S.O. Twin Pack Insulation Adhesive.

Alternatively, the examples given above may also be tested under negative pressure uplift conditions according to a Factory Mutual 1-52 test method.

The examples given above each have a low modulus of elasticity. For example, the provided example 7 has a modulus of 121.5 psi. Similarly, the remaining examples also have soft and flexible characteristics that promote mobility of the chlorinated paraffins within the adhesive.

With reference to FIG. 2, a method of adhering a "neat" EPDM roofing membrane to a roof member is illustrated in flowchart format and indicated by the reference number 100. A "neat" EPDM roofing membrane is described in the present specification to mean a non-fleeced, non-primed, non-surface treated EPDM membrane. In alternative embodiments, other neat water impervious roofing membranes are incorporated. In a step 112, at least one adhesive container is provided. In the example provided, the adhesive is the two-part adhesive described in the examples above. The A and B side components or pre-mixed one-part adhesive may be packaged in several ways and in several types of containers. The adhesive may be stored in a collapsible bag disposed within a box (known as Bag in the Box), stored in Twin Pack Cartridges, stored in rigid containers such as drums or barrels, paired in cylinders, or in flexible, fully compressible structures such as collapsible tubes or collapsible bags that dispense the materials. For example, the adhesive may be stored in a CUBITAINER package available from the Hedwin Corporation of Baltimore, Md. Alternatively, the adhesive may be stored in an adhesive cartridge as described in commonly owned U.S. Provisional Patent Application No. 61/539,271, filed Sep. 26, 2011 or a collapsible bag container such as described in commonly owned U.S. patent application Ser. No. 13/246,498, filed Sep. 28, 2011, both of which are incorporated here by reference in their entirety. In another arrangement, the bags holding the two components are delivered in their respective boxes. The bags are then removed from the boxes and coupled to the applicator system. Such adhesive packaging is described in detail in U.S. application Ser. No. 13/669,954, filed Nov. 6, 2012, the entire contents of which is incorporated herein by reference.

In a step 114, the at least one adhesive container is connected to an adhesive applicator device. In the example provided, the adhesive applicator device is the adhesive applicator described in commonly owned U.S. Pat. No. 7,056,556 issued Jun. 6, 2006, which is hereby incorporated by reference as to the technical disclosure of the adhesive applicator. In alternative embodiments, other adhesive applicator devices may be used, such as multi-bead applicators, battery powered applicators, spray wand applicators, spray rig applicators, pressurized canister applicators, low-pressure pump applicators, and other compatible adhesive applicator devices. For example, in one embodiment, the adhesive applicator device is a POWERPUSH applicator available from Meritool LLC of Ellicottville, N.Y. In another alternative embodiment, the adhesive applicator device is a CR-20 delivery system available from 3M of St. Paul, Minn. In yet another alternative embodiment, the adhesive applicator is a CYCLONE adhesive applicator available from Millenium Adhesive Products of Chagrin Falls, Ohio. In yet another alternative embodiment, the adhesive applicator is a PREDATOR PUMP adhesive applicator available from Graco Inc. of Minneapolis, Minn.

In a step 116 the adhesive is applied to at least one of the EPDM membrane and the roof member with the adhesive applicator device. In the example provided, the roof member is an aged, existing EPDM membrane on a previously assembled roof. The aged, existing EPDM membrane is preferably pressure washed, but not treated or primed. In alternative embodiments, the roof member is a treated or primed EPDM membrane, a smooth surface modified bitumen including SBS and AAP modified bitumens, a smooth surface built-up roof, a concrete roof deck, a wood roof deck, a gypsum roof deck, a polyisocyanurate, XPS, EPS, fiberglass, rockwool, or other insulation member, an isocyanate, gypsum, or other rigid cover board, a steel roof decking, or a TECTUM roof deck member available from Tectum Inc. of Newark, Ohio. It should be appreciated that other roof members may be incorporated without departing from the scope of the present invention.

Furthermore, the adhesive may be applied using various procedures. In the example provided, the A side and B side of a two-part adhesive is first mixed by the adhesive applicator device and then dispensed or otherwise applied to the neat EPDM or the roof member. During and after mixing, the components react to form a polyurethane adhesive having suitable physical properties. Due to the reactive nature of the adhesive composition, the adhesive composition may be applied in ribbon or bead method and may be applied to only one side of the substrate or roofing membrane. It should be appreciated that no mixing is performed when a one-part adhesive is used.

In the example provided, the adhesive is pumped in discrete strips, beads, or ribbons with a desired spacing onto the roof member. Space is left between adhesion points to allow for gas flow, thereby preventing bumps and distortions on the roof substrate. The neat EPDM member is then "broomed" in by applying pressure to the neat EPDM using a broom or similar device to press the EPDM into the adhesive and reduce wrinkles in the installed neat EPDM. In various alternative embodiments, the adhesive is ribbon applied to the neat EPDM, applied in full coverage to the roof member, applied in full coverage to the neat EPDM, ribbon applied to one of the neat EPDM and the roof member and then spread into full coverage, or applied to both the neat EPDM and the roof member in any combination of ribbon application and full coverage application. Additionally, the neat EPDM may be rolled onto the roof member, broomed onto the roof member, "flopped" onto the roof member, or brought into contact with the roof member in various other ways without departing from the scope of the present invention.

It should be appreciated that various types of adhesive applicator devices may be used with various adhesive application methods. For example, forms of application include using a cartridge, using low pressure pumping of the two components and mixing them with a static mixer, or using high pressure tanks that are brought to about 500-1500 psi with an inert dry gas, such as Nitrogen. In the latter form of application, the A and B side materials are metered as two individual components and brought together and mixed by high pressure impingement or by a static mixer and then applied in a bead or ribbon form.

In addition, a multi bead applicator system in which individual components are brought together under ambient conditions and are mixed generally through a static mixer may be employed. The multi bead applicator system may include individual two-component cylinders or the two components may be brought together under various pumping methodologies and mixed through a static mixer. The "A" and "B" side components are generally mixed in a ratio of 1:1 by volume, however the ratio may range from about 10:1 to about 1:10. During mixing, and after mixing, the A Side components and B Side components react to form a polyurethane adhesive having suitable physical properties. Preferably, the adhesive composition is applied in discrete beads or ribbons overtop the roofing substrate, such as the insulation boards or roof deck or roofing membrane. Next, the roofing membrane is rolled or otherwise positioned overtop of the adhesive composition and the roofing substrate. The adhesive composition then cures and secures the roofing membrane to the roofing substrate. Due to the formulation of the adhesive composition of the present invention, the roofing substrate and the roofing membrane may be untreated, i.e., no primer or membrane fleece back is required to achieve the desired adhesive strength. The multi-bead applicator may also be used to apply the adhesive composition in a one-part configuration.

In a step 118 heat is applied to the newly installed neat EPDM membrane. In the example provided, a heated roller is applied over the neat EPDM to promote the exothermic reaction in cold weather installations. It should be appreciated that other methods of applying heat may be incorporated or the application of heat may be omitted without departing from the scope of the present invention.

The method of adhering a "neat" EPDM roofing membrane to a roof member provides several advantages over existing methods. The present method provides a VOC free application using curable chemistry between two water-impervious membranes. Furthermore, the present method does not require a fleece backing or priming to adhere the EPDM roofing membrane to the roof member.

In various arrangements the two-part adhesive exhibits a slow reaction initiation time to allow greater wet out of the substrates for improved adhesion. Some imidazole structures (permethylated nitrogen) act as latent catalysts and are more effective after heat aging of the polymer. Other imidazole structures (active hydrogen) produce blocked isocyanates that become un-blocked with heat. Various two-part adhesives exhibit an acceptable cure time of the adhesive which allows for enough green strength to resist wind up-lift forces on a roof. (This improvement is from polymer viscosity build and tensile strength increase.) The two-part adhesive can exhibit an acceptable cure time of the adhesive to lock down the membranes to allow normal activities on a roof. (This improvement is from polymer viscosity build and tensile strength increase.) The two-part adhesive in some implementations has an NCO to OH ratio resulting in a soft polymer with a modulus of less than 500 psi and is tacky with a T-peel breakaway strength of greater than 0.5 pli.

The two-part adhesive can contain an MDI isocyanate pre-polymer having a high 2-4' content which exhibits a slow reaction initiation time to allow greater wet out of the substrates for improved adhesion. (This is due to a balance of 4-4' MDI with 2-4' MDI allowing for fast polymer formation from 4-4' and slower reaction and good wet-out due to steric hindrance of the 2-4'.) Certain two-part adhesives contain Di-ethanol amine or other additives which disrupt the hard/soft segment blocks of the polyurethane adhesive resulting in a soft polymer with good peel strength (see for example #9). The two-part adhesives can contain an acid composition that can alter the surface tension or chemistry of the adhesive or membrane allowing for better wet out or creation of reactive sites and improved adhesion.

Further note that the above adhesive compositions are not limited to being applied as beads or ribbons. For example, these adhesive compositions can be applied with a spreader with full coverage, such as described in U.S. Provisional Patent Application Nos. 61/692,813 filed Aug. 24, 2012, 61/713,292 filed Oct. 12, 2012, and 61/737,361 filed Dec. 14, 2012, and commonly owned U.S. Provisional Application entitled "Roofing Adhesive Distribution Apparatus" filed herewith, the entire contents of all of which are incorporated herein by reference.

In various arrangements, the adhesive compositions described above may or may not include paraffins or other adhesion promoters. Any of the compositions may include chain extenders such as, for example, glycerin, diethylene glycol etc. for back end cure speed improvements. The addition of glycerin or similar chemistries provide a formulation that performs as a roofing adhesive over a wide application temperature range. This allows sufficient we-out time during the initiation of the reaction time to allow for adhesive to the roofing substrate. Further, the formulation with glycerin or similar chemistries exhibits acceptable completion of reaction to make the membrane resistant to wind up-lift forces in a timely manner. In certain compositions with glycerin or similar chemistries, the application temperature range for these compositions have a range from about 0° F. to about 190° F.

The adhesive compositions may be pressure sensitive adhesives (PSA). Such adhesives can be readily dispensed as a liquid that cures to its final form within a desired period of time with final physical properties (i.e. pressure sensitive adhesive) that allow it to adhere to, for example, a polymeric sheet with adequate bond strength to resist application stresses.

The compositions can include high molecular weight polymer additions such as tackifiers and rheology modifiers. The reduction or elimination of entrapped air can be obtained through polymer cure speed, polymer rheology or the method of applying the adhesive. For example, employing faster polymer viscosity increase or use of the spreader to trap less air between membranes.

The description of the invention is merely exemplary in nature and variations that do not depart from the gist of the invention are intended to be within the scope of the invention. Such variations are not to be regarded as a departure from the spirit and scope of the invention.

What is claimed is:

1. A two-part adhesive having an A side and a B side, the two-part adhesive comprising:
    at least one of a polyurethane prepolymer and a diisocyanate present in the A side;
    not more than two polyols present in the B side, wherein the weight ratio of the two polyols is at least 4:1;
    at least one catalyst present in the B side;
    a blowing agent present in an amount of less than 1 wt % of the B side; at least on adhesion promoter in at least one of the A side or the B side in an amount of about 10% to 50% by weight of the two-part adhesive and wherein the A side and the B side of the two part adhesive are mixed in a volumetric ratio of 1:1 and the two part adhesive has a heat aged T-peel breakaway strength of at least about 1 pli.

2. The two-part adhesive of claim 1, wherein
    the at least one of a polyurethane prepolymer and a diisocyanate is present in the A side in an amount of 100% by weight of the A side composition;
    a first polyol of the two polyols present in the B side in an amount from about 75% to about 89.73% by weight of the B side composition;
    a second polyol of the two polyols is present in the B side in an amount from about 4% to about 19%;
    the at least one catalyst is present in the B side in an amount from about 0.5% to about 5% by weight of the B side composition; and
    the blowing agent is present in in an amount of 0.25% by weight of the two-part adhesive.

3. The two-part adhesive of claim 1 further comprising at least one adhesion promoter in at least one of the A side and the B side.

4. The two-part adhesive of claim 1 wherein the at least one of a polyurethane prepolymer and a diisocyanate is a prepolymer.

5. The two-part adhesive of claim 1 wherein the two polyols includes at least one of a multifunctional polyether polyol and a polyester polyol.

6. The two-part adhesive of claim 1 wherein the two polyols includes at least one of a polyether diol and a polyester diol.

7. The two-part adhesive of claim 1 wherein the at least one catalyst is a diazole.

8. The two-part adhesive of claim 1 wherein the at least one catalyst is an imidazole.

9. The two-part adhesive of claim 1 wherein the at least one catalyst is a 1-methylimidazole.

10. The two-part adhesive of claim 1 wherein the at least one catalyst is 2,2-dimorphorlinodiethylether.

11. The two-part adhesive of claim 1 wherein the at least one catalyst is a quaternary ammonium salt.

12. The two-part adhesive of claim 1 wherein the B side composition and the A side composition are pumpable.

13. The two-part adhesive of claim 1 wherein the B side composition and the A side composition are sprayable.

14. The two-part adhesive of claim 1 wherein the two-part adhesive has an application range from about 0° F. to about 190° F.

15. The two-part adhesive of claim 1 wherein the two-part adhesive composition has a balance of cure speed, adhesion strength, and tack.

16. The two part adhesive of claim 3 wherein the at least one adhesion promoter is selected from the group consisting of chlorinated paraffins and chlorinated polyolefins.

* * * * *